United States Patent [19]

Akatsuka

[11] Patent Number: 4,589,020
[45] Date of Patent: May 13, 1986

[54] TV VIDEO DATA INPUT APPARATUS

[75] Inventor: Yuichiro Akatsuka, Tama, Japan

[73] Assignee: Olympus Optical Co., Ltd., Tokyo, Japan

[21] Appl. No.: 554,463

[22] Filed: Nov. 22, 1983

[30] Foreign Application Priority Data

Nov. 22, 1982 [JP] Japan ............................ 57-203568
Jul. 14, 1983 [JP] Japan ............................ 58-128497

[51] Int. Cl.[4] .................................................. H04N 5/14
[52] U.S. Cl. .................................. 358/160; 358/21 R;
358/903; 364/514; 340/799; 365/189
[58] Field of Search ............... 358/160, 21 R, 140,
358/903; 340/799; 364/514; 365/189, 205, 217, 236, 237

[56] References Cited

U.S. PATENT DOCUMENTS

4,148,070 4/1979 Taylor ............................... 358/160
4,498,081 5/1985 Fukushima et al. ............... 340/799

FOREIGN PATENT DOCUMENTS

53-30837 8/1977 Japan .

Primary Examiner—Michael A. Masinick
Assistant Examiner—Michael D. Parker
Attorney, Agent, or Firm—Armstrong, Nikaido, Marmelstein & Kubovcik

[57] ABSTRACT

A TV video data input apparatus samples and quantizes a video signal from a TV camera and feeds the quantized data into a computer. The input apparatus is provided with means for generating sampling clocks different from each other while selectively changing over the sampling clocks correspondingly to characteristics of a TV picture. An A/D converting means is driven by the sampling clocks to convert the video signal into digital video data. The output of the A/D converting means is written in a memory. Thus, it is possible to switch over the writing of the video data into a memory having a short access time at a high speed and that into a memory having a long access time at a low speed.

4 Claims, 11 Drawing Figures

TV VIDEO DATA INPUT APPARATUS

BACKGROUND OF THE INVENTION

The present invention relates to a TV video data input apparatus employed for processing TV pictures by means of a computer.

It is a general practice that the video data from a TV camera are sampled and quantized, and the quantized data are fed into a computer to effect a picture processing.

For feeding the quantized data into a computer that effects a picture processing, such an input apparatus has been conventionally employed as having the following arrangement: A video signal from a TV camera is first converted into digital data by an A/D converter and written in a video memory. In this case, the addresses of the digital data are specified by an address generator. The sampling order on a TV screen is as follows: Assuming that sampling points (picture elements) on a first horizontal scanning line are denoted by (1, 1) to (m, 1), those on a second horizontal scanning line by (1, 2) to (m, 2), and those on an n-th scanning line by (1, n) to (m, n), during a first horizontal scanning, sampling is effected over the sampling points, from (1, 1) to (2, 1), (3, 1), ... (m, 1), and during a subsequent horizontal scanning, sampling is effected over the sampling points (1, 2), 2, 2), ... (m, 2). Then, in a similar manner, sampling is continued up to the sampling point (m, n). Thus, the video data about all the picture elements on one frame are written in the memory during one vertical scanning.

When the video data about all the picture elements on one frame are thus sampled during one vertical scanning period, a high-speed memory is required. As a high-speed memory for this purpose, a static RAM is available which is short in access time. This RAM is, however, high in cost and poor in mounting properties disadvantageously.

As another prior art, there is an input apparatus which employs such a means that video data about all the picture elements on one frame are written in a memory during the period of several vertical scannings in the case where a real-time data processing is not required, i.e., it is not necessary to write in the memory all the video data on one frame during one vertical scanning period, e.g., in the case of a static picture or the like. In this prior art, as the memory, it is possible to employ a dynamic RAM which is long in access time and more excellent in mounting properties as well as cost than the static RAM.

However, this method in which all the picture element data on one frame are sampled by several vertical scannings is unfavorably low in sampling rate, so that any dynamic picture cannot be handled disadvantageously.

In addition, since the conventional means of sampling all the picture element data during one vertical scanning period and the other conventional means of sampling all the picture element data during the period of several vertical scannings are independent of each other and different in hardware from each other, the kinds of memory devices usable for the respective means are limited. Accordingly, it has been impossible to make a single data input apparatus effect both the writing of all the picture element data in real time and the writing of the all the picture element data during the period of several vertical scannings.

SUMMARY OF THE INVENTION

Accordingly, a primary object of the invention is to provide a TV video data input apparatus improved to be able to selectively employ as the video memory a memory having a short access time for pictures requiring a high-speed input, such as dynamic pictures, and a memory which is inexpensive and excellent in mounting properties for pictures not requiring any high-speed input, such as static pictures.

To this end, according to the invention, there is provided a TV video data input apparatus that samples and quantizes a video signal from a TV camera and then feeds the quantized data into a computer, the input apparatus comprising: a means for generating various sampling clocks while selectively changing over the sampling clocks according to the characteristics of a TV picture; an A/D converting means for quantizing a video signal through A/D conversion on receipt of the sampling clocks; a memory having a short access time or a memory having a long access time for storing the output from the A/D converting means; and a writing means for writing in the memory the output from the A/D converting means, whereby the writing of the output from the A/D converting means into the memory having a short access time at a high speed and the writing of the output into the memory having a long access time at a low speed can be switched over from one to the other according to the characteristics of the TV picture.

The above and other objects, features and advantages of the invention will become clear from the following description of the preferred embodiments taken in conjunction with the accompanying drawings.

DESCRIPTION OF THE PRIOR ART

Prior to the description of embodiments of the invention, a conventional TV video data input apparatus will be described hereinunder with reference to FIG. 1.

Figure 1:
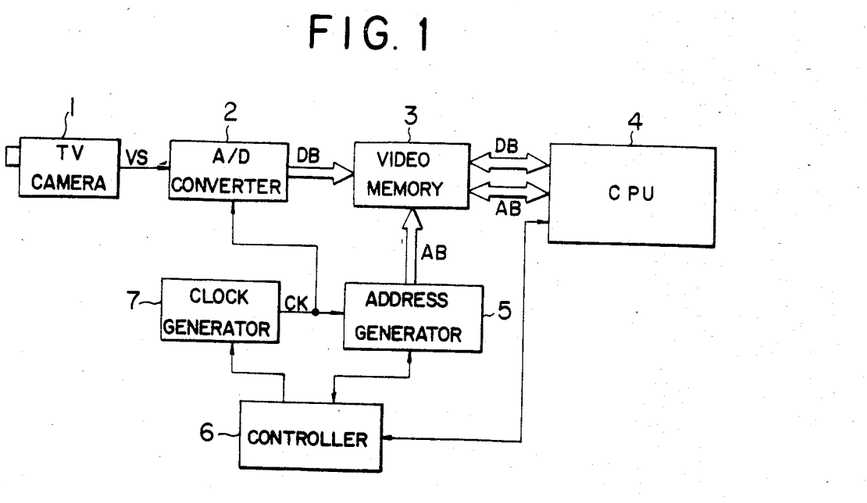
FIG. 1 is a block diagram of a conventional TV video data input apparatus.

In FIG. 1, a reference numeral 1 denotes a TV camera, while a numeral 2 represents an A/D converter that converts a video signal from the TV camera 1 into a digital video data. A video memory 3 for storing the converted digital video data utilizes a part of an internal memory of a CPU 4. An address generator 5 generates addresses required when the video data are transferred to the video memory 3 in a DMA data transfer manner. A controller 6 effects such controls as changeover between buses in response to a picture sampling request from the CPU 4 and resetting upon completion of the picture sampling. Moreover, a reference numeral 7 denotes a clock generator. In addition, a data bus is represented by a symbol DB, an address bus by AB, a video signal by VS, and a clock by CK.

In the thus constructed TV picture video data input apparatus, the video signal VS from the TV camera 1 is converted into a digital data by the A/D converter 2 according to the instruction from the controller 6 and written in the video memory 3. During this operation, the CPU bus is placed in a holding state, and addresses are specified by the address generator 5. The sampling order on the TV screen will be described hereinunder with reference to FIG. 2. In this example, the scanning system of the TV camera is assumed to be the progressive scanning in order to simplify the description. In an effective scanning screen area 8: (1, 1) to (m, 1) denote respective sampling points on a first horizontal scanning line; (1, 2) to (m, 2) represent respective sampling points on a second horizontal scanning line; and (1, n) to (m, n) indicate respective sampling points on an n-th horizontal scanning line. In this case, m represents any integer showing a sampling number in the horizontal direction, while n represents any integer showing a sampling number in the vertical direction. In a first horizontal scanning, sampling is effected over the sampling points, from (1, 1) to (2, 1), (3, 1) . . . (m, 1). In a subsequent horizontal scanning, sampling is effected over the sampling points (1, 2), (2, 2), . . . (m, 2). Thereafter, in a similar manner, sampling is continued up to the sampling point (m, n). The video data sampled at each sampling point is successively written in the memory 3 before the subsequent sampling point (picture element) is sampled. In this way, video data about all the picture elements on one frame are written in the memory during one vertical scanning. When video data about all the picture elements on one frame are thus sampled during the period of one vertical scanning, i.e., when it is intended to sample the video signal from the TV camera without degrading the signal band, a sampling rate on the order of 6 MHz is required when the number of picture elements on one horizontal scanning line is assumed to be about 256. If it is intended to write the video data into a memory in a computer while maintaining this rate, a DMA data transfer is needed. In addition, the memory is required to have an access time of about 160 ns. As such a high-speed memory, a static RAM is available which is short in access time. This RAM is, however, high in cost and poor in mounting properties disadvantageously.

Figure 2:
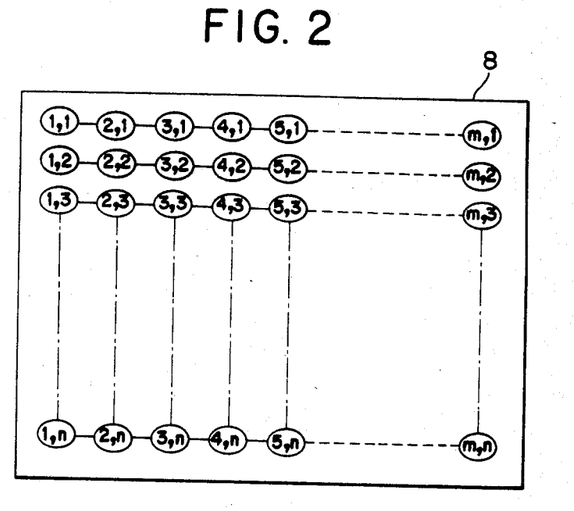
FIG. 2 schematically shows sampling points on an effective scanning screen area of a TV screen.

On the other hand, when a real-time data processing is not required, i.e., when it is not necessary to write all the video data on one frame in the memory during the period of one vertical scanning, e.g., in the case of static pictures, it is possible to employ a means of writing all the video data on one frame during the period of several vertical scannings. For example, during a first horizontal scanning the sampling point (1, 1) is sampled, and during a second horizontal scanning the sampling point (1, 2) is sampled, and thus during a first one vertical scanning the sampling points on one vertical line, from (1, 1) to (1, n), are sampled. During a subsequent vertical scanning, the sampling points, from (2, 1) to (2, n), are sampled. In this way, all the picture elements on one frame are sampled by m vertical scannings. In this case, the time for writing video data in the memory is allowed to be as long as the period of about one horizontal scanning, from the point of time when one sampling point (picture element) is sampled until the point of time when a subsequent sampling point (picture element) is sampled. Since one horizontal scanning time of the television is about 63.5 $\mu$s, it becomes possible to employ a dynamic RAM, which is more excellent in both mounting properties and cost than the static RAM.

Moreover, as an application of this means, such a method may be employed that several sampling points are sampled during one horizontal scanning. More specifically, it is possible to arrange such that the sampling points at which video data are sampled are horizontally shifted every vertical scanning: for example, during a first vertical scanning, video data are sampled at intervals of eight points, such as the sampling points (1, 1), (9, 1), (17, 1), (25, 1) . . ., and during a subsequent vertical scanning the video data are sampled at the sampling points (2, 1), (10, 1), (18, 1), (26, 1) . . ., thereby to sample all the picture element data on one frame by eight vertical scannings.

In this way, a longer time is allowed for writing the video data in the memory. However, this method in which all the picture element data on one frame are sampled by several vertical scannings is low in sampling rate, so that any dynamic picture cannot be handled disadvantageously.

DESCRIPTION OF THE PREFERRED EMBODIMENTS

Embodiments of the invention will be described hereinunder in detail with reference to the accompanying drawings.

Figure 3:
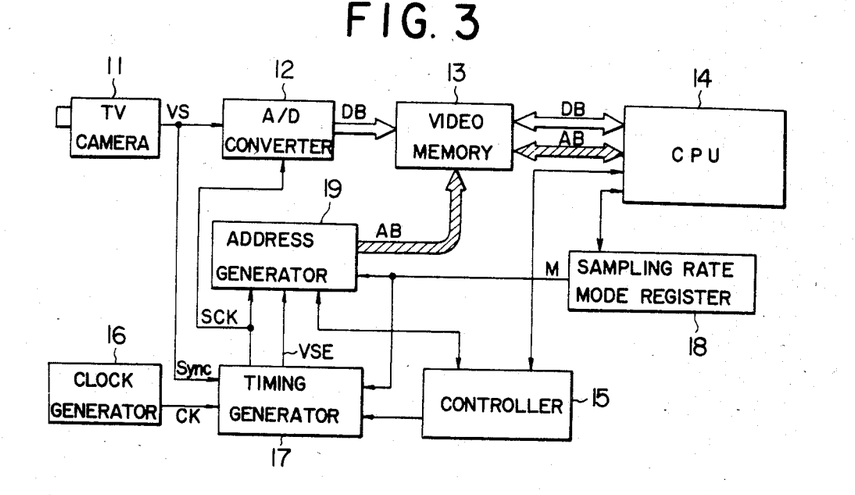
FIG. 3 is a block diagram of a first embodiment of the TV video data input apparatus in accordance with the invention.

FIG. 3 is a block diagram of a first embodiment of the TV video data input apparatus in accordance with the invention. In FIG. 3, a reference numeral 11 denotes a TV camera, while a numeral 12 represents an A/D converter that converts a video signal from the TV camera 11 into a digital video data. A video memory 13 for storing the digital video data utilizes a part of an internal memory of a CPU 14. A controller 15 effects such controls as changeover between buses in response to a picture sampling request from the CPU 14 and resetting upon completion of the picture sampling. A clock generator 16 forms a reference clock, and a timing generator 17 formes various timing pulses on the basis of the reference clock. A sampling rate mode register 18 is for selecting a picture sampling rate. An address generator 19 generates addresses required when a DMA data transfer is effected and has a function to store video data in the memory in the time series order thereof on the TV screen. In addition, a video signal is represented by a reference symbol VS, a reference clock by CK, a sampling clock by SCK, a composite synchronizing signal by Sync, a vertical synchronizing signal by VSE, a mode changeover signal by M, an address bus by AB, and a data bus by DB.

In operation, the video signal VS from the TV camera 11 is converted into digital video data in the A/D converter 12 driven by the sampling clock SCK from the timing generator 17. The video data are written in the video memory 13 at addresses generated by the address generator 19. During this operation, the CPU bus is placed in a holding state. In addition, before issuing a picture sampling command, the CPU 14 specifies a sampling rate mode through the sampling rate mode register 18. It is to be noted that the arrangement is such that the mode of each of the address generator 19 and the timing generator 17 is also changed over according to the contents of the register 18.

The following is the description of practical examples of the video data sampling rate mode in the case of four sampling rate modes. Examples of the four sampling rate modes include the following: (1) the method in which video data about all the picture elements on one frame are sampled during the period of one vertical scanning (the mode of sampling every picture element); (2) the method in which all the picture element data on one frame are sampled during the period of two vertical scannings (the mode of sampling every two picture elements); (3) the method in which all the picture element data on one frame are sampled during the period of four vertical scannings (the mode of sampling every four picture elements); and (4) the method in which all the picture element data on one frame are sampled during the period of eight vertical scannings (the mode of sampling every eight picture elements).

Figure 4:
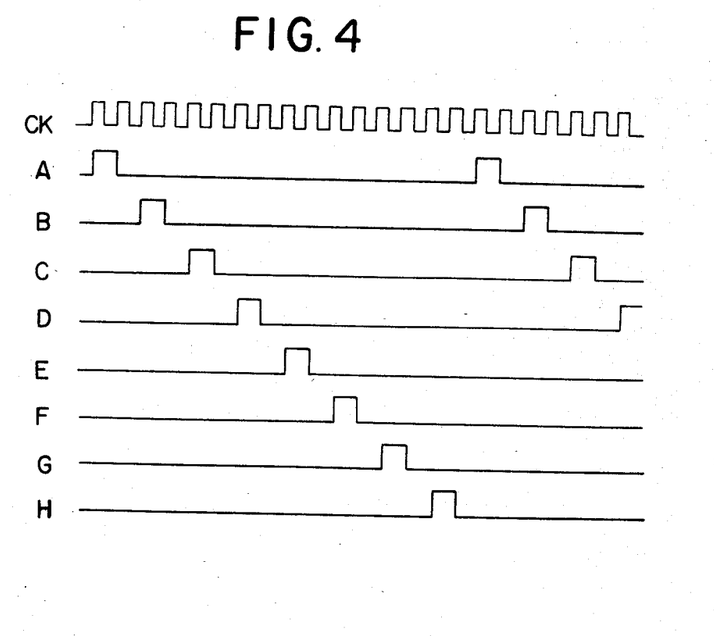
FIG. 4 is a timing chart of timing pulses formed in a timing generator of the device shown in FIG. 3.

The means for forming the sampling clock SCK required for carrying out these four sampling rate modes will be explained with reference to FIGS. 4 to 6. FIG. 4 is a timing chart of timing pulses formed by the timing generater 17. First of all, from the reference clock CK of 12 MHz, for example, formed in the reference clock generator 16, eight-series (eight-phase) timing pulses A to H are formed by the combination of shift register and gate circuit.

Figure 5:
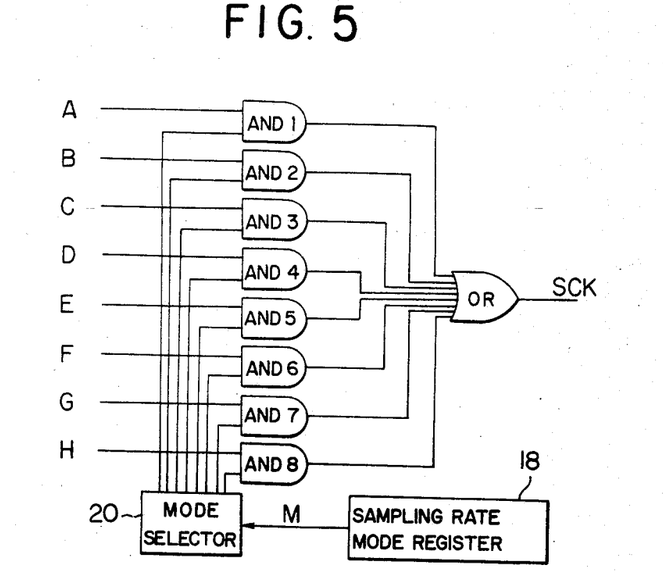
FIG. 5 is a block diagram of an example of a sampling clock generating section in the timing generator of the device shown in FIG. 3.

Referring now to FIG. 5 which shows a sampling clock generating section in the timing generator 17, the timing pulses A to H shown in FIG. 4 are applied to terminals represented by symbols A to H, respectively. The timing pulses A to H are fed into AND gates $AND_1$ to $AND_8$, which are controlled by the outputs of a mode selector 20, respectively, operated by the output M of the sampling rate mode register 18. The outputs of the respective AND gates are sent to an OR gate OR from which the sampling clock SCK is delivered. In the sampling clock generating section, the mode selector 20 is operated according to the mode specified by the CPU 14 through the sampling rate mode register 18, to apply gate signals to the AND gates $AND_1$ to $AND_8$ in order to select timing pulse signals to be sent to the OR gate OR. In this way, some of the timing pulses A to H are combined to form the sampling clock SCK.

Figure 6:
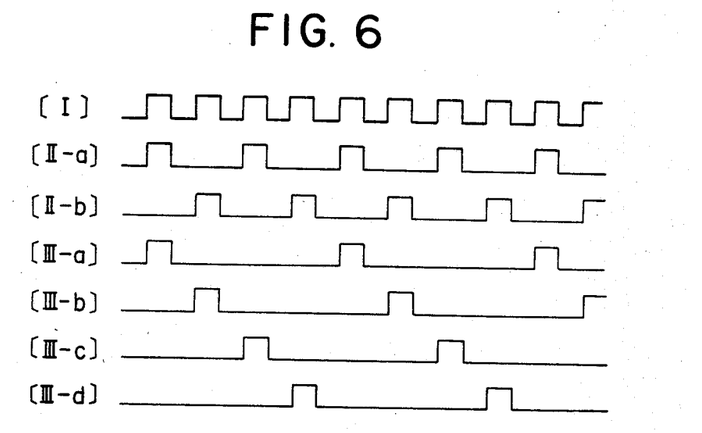
FIG. 6 is a timing chart of sampling clocks formed in the sampling clock generating section shown in FIG. 5.

FIG. 6 shows a timing chart of sampling clocks thus obtained. A sampling clock [I] employed in the mode of sampling every picture element is formed by selecting all the timing pulses A to H and ORing them. In the case of the mode of sampling every two picture elements, a timing pulse [II-a] formed by ORing the timing pulses A, C, E and G is employed as the sampling clock during the period of a first vertical scanning; a timing pulse [II-b] formed by ORing the timing pulses B, D, F and H is employed as the sampling clock during the period of a subsequent vertical scanning. Thus, it is possible to sample a half of all the picture elements on one frame during the period of the first vertical scanning and the other half of the picture elements during the period of the subsequent vertical scanning. In the case of the mode of sampling every four picture elements, as the sampling clock, a timing pulse [III-a] formed from the timing pulses A and E is employed during the period of a first vertical scanning, a timing pulse [III-b] formed from the timing pulses B and F during the period of a second vertical scanning, a timing pulse [III-c] formed from the timing pulses C and G during the period of a third vertical scanning, and a timing pulse [III-d] formed from the timing pulses D and H during the period of a fourth vertical scanning. Thus, a fourth of all the picture elements on one frame is sampled during the period of each of the above-mentioned vertical scannings, i.e., all the picture elements are sampled by four vertical scannings.

In the case of the mode of sampling every eight picture elements, similarly, the timing pulses A to H are employed as the sampling clocks for eight vertical scannings, respectively, and an eighth of all the picture elements on one frame are sampled during the period of each of the eight vertical scannings, i.e., all the picture elements are sampled by eight vertical scannings.

Thus, it becomes possible to select four kinds of time for writing digital data in the memory by employing the thus formed four kinds of sampling clock signals SCK as conversion-starting signals for the A/D converter 12 and by sampling and holding the digital video data converted by the A/D converter 12. The selection of a sampling clock corresponding to each mode is effected by the mode changeover signal M from the sampling rate mode register 18.

In this way, it becomes possible to select a write time for the video data sent from the TV camera according to characteristics of the TV picture or the like and store the video data in a memory corresponding to the write time. However, when the video data from the TV camera 1 is stored in the memory, it is usually easier to handle the video data if they are arranged in the time series order on the TV screen. More specifically, it is preferable that the video data about the picture elements corresponding to the sampling points (1, 1) to (m, 1) shown in FIG. 2 should be first stored in order from the first address in the memory and subsequently, the data about the picture elements corresponding to the sampling points (1, 2) to (m, 2) ... (1, n) to (m, n) should be stored.

In the invention, however, although there is no problem in the case of the mode of sampling every picture element, in the modes other than this the video data sampling order varies according to the sampling mode employed, i.e., how the picture elements are sampled. In the case of the mode of sampling every two picture elements, for example, during a first vertical scanning period, the data about the picture elements corresponding to the sampling points (1, 1), (3, 1), (5, 1) to (m−1, 1) (where m is any even number) are delivered from the A/D converter 12, followed by the data about the picture elements corresponding to the sampling points (1, 2), (3, 2), (5, 2) to (m−1, 2) ... (1, n), (3, n), (5, n) to (m-1, n). Then, during a subsequent vertical scanning period, the data about the picture elements corresponding to the sampling points (2, 1), (4, 1), (6, 1) to (m, 1) ... (2, n), (4, n), (6, n) to (m, n) are delivered. In order to store in the memory these picture element data in the time series order on the TV screen, it is necessary to regulate the order of addresses generated in the address generator.

Figure 7:
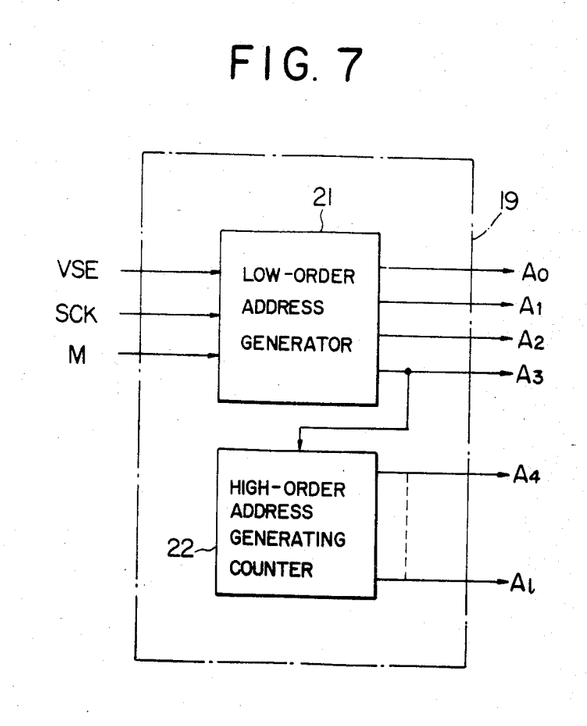
FIG. 7 is a block diagram of an example of an address generator of the device shown in FIG. 3.

FIG. 7 is a block diagram of an example of the address generator 19 employing flip-flops in the case of the above-mentioned four sampling rate modes. It is assumed that one address is assigned to one picture element in storing video data in the memory. In FIG. 7, a reference numeral 21 denotes a low-order address generator for generating low-order addresses. The outputs $A_0$ to $A_3$ of the low-order address generator 21 correspond to the lowest-order bit (LSB) to the fourth bit from the LSB of each address, respectively. On the other hand, a high-order address generating counter 22 takes as its input the output $A_3$ of the low-order address generator 21. The outputs $A_4$ to $A_l$ (l represents any integer; if the number of picture elements is 256 by 256, l=15) similarly correspond to the fifth bit from the LSB to the (l+1)th bit (MSB) of each address, respectively.

The thus constructed address generator 19 operates as follows: First of all, in the case of the mode of sampling every picture element, a register constituted by flip-flop is made to count up by the sampling clock SCK to deliver the output $A_0$ corresponding to the lowest-order bit, by which a register that delivers the output $A_1$ is made to count up. Subsequently, registers that deliver the outputs $A_2$ to $A_l$ are made to count up in order. In this way, a series of addresses are generated.

When the mode of the low-order address generator 21 is changed over to the mode of sampling every two picture elements by the mode changeover signal M, during a first vertical scanning, the output $A_0$ is maintained low in level, and the register that delivers the output $A_1$ is made to count up by the sampling clock SCK. Thereafter, by the output thereof, the register that delivers the output $A_2$ is made to count up. Subsequently, the registers that deliver the outputs $A_3$ to $A_l$ are made to count up in order. Thus, when one vertical scanning has been completed, the registers corresponding to all the bits except for the output $A_0$ are cleared, and the register that delivers the output $A_0$ is made to count up by the vertical synchronizing signal VSE. During a second vertical scanning, the registers that deliver the output $A_1$ to $A_l$ generate outputs similar to those generated during the first vertical scanning, respectively, to form addresses. By such address generating operation, the picture element data sampled during the first vertical scanning are placed at even-number addresses, respectively, while the picture element data sampled during the second vertical scanning are placed at odd-number addresses, respectively. Accordingly, the various picture element data can be stored in the time series order on the TV screen.

Also in the case of the mode of sampling every four picture elements, similarly, the register that delivers the output $A_2$ is made to count up by the sampling clock SCK. Then, the register that delivers the output $A_3$ is made to count up by the output thereof. Subsequently, the registers that deliver the outputs $A_4$ to $A_l$ are made to count up in order. The outputs $A_2$ to $A_l$ are sent out in the same order for each vertical scanning. On the other hand, the outputs $A_0$ and $A_1$ corresponding to the LSB and the second bit from the LSB, respectively, are maintained low in level during the first vertical scanning period. During a second vertical scanning period, the register that delivers the output $A_0$ is made to count up by the vertical scanning synchronizing signal VSE to deliver the output $A_0$. Moreover, during a third vertical scanning period, the register that delivers the output $A_1$ is made to count up by the output $A_0$ to deliver the output $A_1$ corresponding to the second bit from the LSB. By thus forming addresses, data are stored at intervals of four addresses as well as at addresses shifted by one address for each vertical scanning. Accordingly, the data can be stored in the time series order on the TV screen.

Moreover, also in the case of the mode of sampling every eight picture elements, i.e, in the case of the sampling all the picture element data during the period of eight vertical scannings, the operation is similar to those in the above cases. More specifically, the bits corresponding to the low-order outputs $A_0$, $A_1$ and $A_2$ represent the counted numbers of vertical scannings, respectively, and as the high-order outputs $A_3$ to $A_l$, the same outputs are generated throughout the various vertical scannings, thereby allowing the data to be stored in the time series order on the TV screen.

The low-order address generator for effecting the above operation can be readily constructed by combining synchronous counters employing flip-flops and gate circuits.

Although in the above embodiment the TV video data input apparatus has been shown which has the four kinds of video data sampling rate modes obtained from the four kinds of sampling clocks formed by combining the eight-series timing pulses, it is possible to specify video data sampling rates which are further subdivided, by increasing the number of kinds of timing pulses. Moreover, if the video data sampling rate is lowered to such an extent that the transfer of video data can be controlled by an I/O transfer command from the CPU, it also becomes possible that the CPU specifies the memory locations to which video data are to be transferred.

By the way, in the above embodiment, the address generator 19 is made to count up by employing the sampling clock SCK. Therefore, in the case where all the data are sampled by N (N:integer) vertical scannings, the number of the picture elements in the horizontal direction is required to be a multiple of N. If the number is not a multiple of N, it is impossible to store the data in the time series order. In addition, although this embodiment can easily effect sampling during the period of vertical scannings in number equal to a multiple of 2, the embodiment cannot cope with the case where data are sampled at such rates as three vertical scannings, five vertical scannings and so forth, disadvantageously.

For example, the problem encountered when the data about 5 by 4 picture elements are sampled in the mode of sampling one frame by two vertical scannings will be explained hereinunder with reference to FIG. 8.

Figure 8:
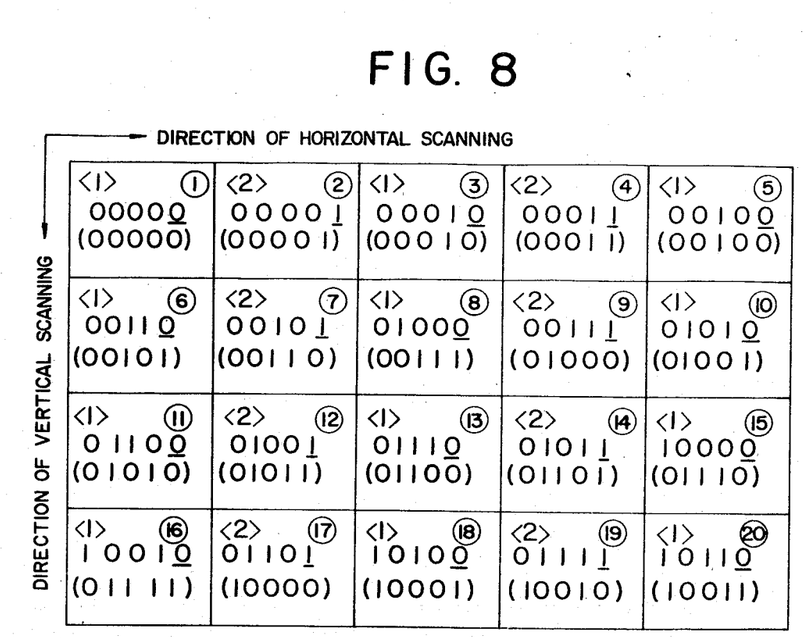
FIG. 8 illustrates addresses, represented by binary numbers, assigned to various picture elements during respective vertical scanning periods in the device shown in FIG. 3.

In FIG. 8, represent blocks ①  to ⑳ represent picture elements, respectively. Picture elements <1> are sampled during a first vertical scanning period, while picture elements <2> are sampled during a second vertical scanning period Numerals written in the blocks ① to ⑳ represent addresses assigned to the picture elements in binary numbers. In addition, the addresses alloted when these picture element data are placed in the time series order on the TV screen are shown by binary numbers in the parentheses in the respective block ① to ⑳ and are denoted by Ⓐ.

In the first embodiment, the lowest-order bit of each address is counted up by the vertical synchronizing signal; therefore, the lowest-order bit is "0" during the first vertical scanning period but "1" during the second vertical scanning period. The upper five-digit addresses (binary numbers) in the respective blocks ① to ⑳ are addresses allotted in this method. The lowest-order bit of each of the addresses is indicated by an underline, and this address is denoted by Ⓑ. These addresses Ⓐ and Ⓑ are different from each other in all the rows except for the first row. This is because in this sampling method the last picture element in each row and the first picture element in the subsequent row (these two picture elements are consecutive in the time series on the TV screen) are those which are sampled during the first vertical scanning period. Such a condition occurs in the case of the mode of sampling one frame by four or eight vertical scannings. In such a case, the generated addresses cannot be arranged in the time series order, unless the number of picture elements in each row is set so that the first picture element in each row is sampled during the first vertical scanning period and the last picture element in each row is sampled during the fourth or eighth vertical scanning. More specifically, the generated addresses cannot be arranged in the time series order, unless the number of picture elements in the horizontal direction (the direction parallel to the rows) is a multiple of four or eight.

A second embodiment of the invention, described hereinunder, is arranged so as to eliminate the need for the picture element number in the horizontal direction to be a multiple of N even in the case where all the picture element data are sampled during the period of N vertical scannings as well as permit N to be any desired integer and make it possible to set a video data sampling range.

Figure 9:
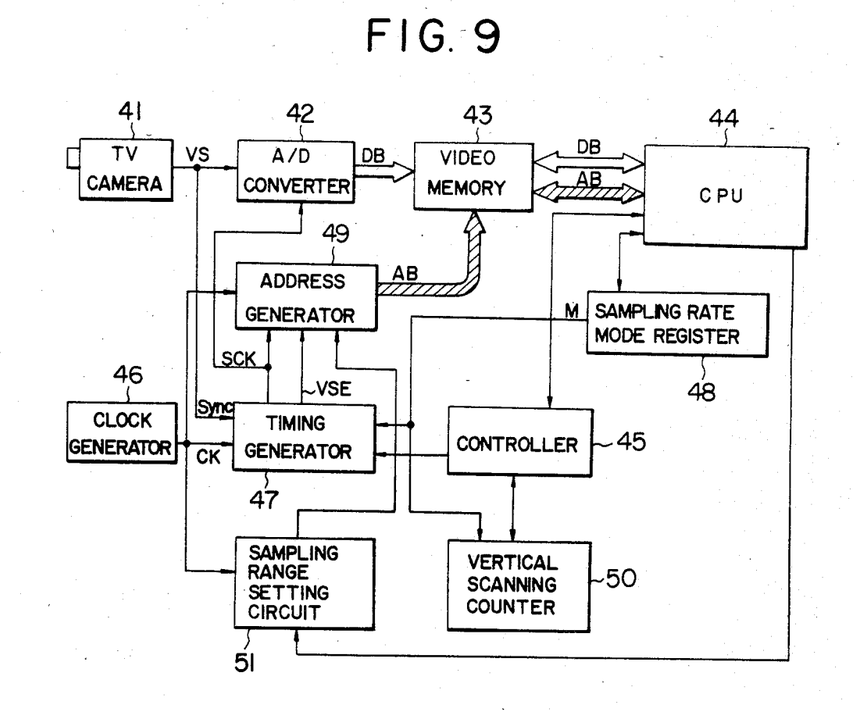
FIG. 9 is a block diagram of a second embodiment of the invention.

Referring now to FIG. 9 which is a block diagram of the second embodiment of the invention, a reference numeral 41 denotes a TV camera 1, while a numeral 42 represents an A/D converter that converts a video signal from the TV camera 41 to a digital video data. A video memory 43 for storing the converted video data utilizes a part of an internal memory of a CPU 44. A controller 45 effects such controls as changeover between buses in response to a video data sampling request from the CPU 44 and resetting upon completion of the video data sampling. A clock generator 46 forms a reference clock. A timing generator 47 forms various timings on the basis of the reference clock. A sampling rate mode register 48 is for selecting a video data sampling rate. An address generator 49 for generating addresses required when video data are transferred in a DMA data transfer manner has means for storing video data in the time series order on the TV screen. A vertical scanning counter is denoted by a reference numeral 50, while a sampling range setting circuit 51 sets a picture sampling range. In addition, a video signal is represented by a symbol VS, a composite synchronizing signal by Sync, a vertical synchronizing signal by VSE, a mode changeover signal by M, an address bus by AB and a data bus by DB.

Figure 10:
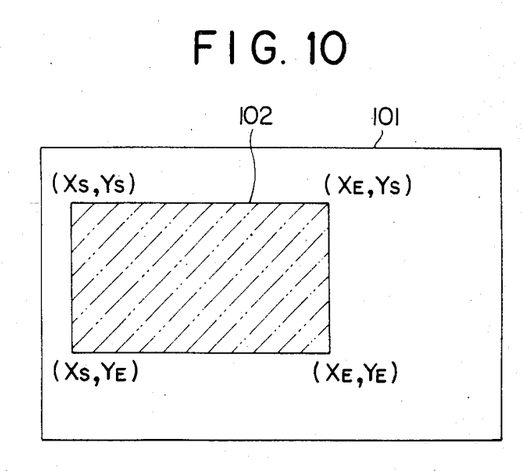
FIG. 10 shows coordinates representing the sampling start position and end position within a sampling range on the TV screen of the device shown in FIG. 9.

In operation, the video signal VS from the TV camera 41 is converted into a digital video data in the A/D converter 42 driven by the sampling clock SCK from the timing generator 47. The video data are written in the video memory 43 at addresses generated by the address generator 49. During this operation, the CPU bus is placed in a holding state, and before issuing a picture sampling command, the CPU 44 specifies a sampling rate mode through the sampling rate mode register 48. It is to be noted that the mode of each of the address generator 49 and the timing generator 47 is also changed over according to the contents of the register 48. Moreover, the CPU 44 previously instructs the sampling range setting circuit 51 to set a sampling start position and end position. The setting of the sampling start position and end position is effected by specifying, as shown in FIG. 10, coordinates $(X_S, Y_S)$ of the sampling start position and coordinates $(X_E, Y_E)$ of the sampling end position within a sampling range 102 in an effective scanning screen area 101.

As practical examples of the video data sampling rate modes, it is possible to provide four sampling rate modes similar to those in the first embodiment: the mode of sampling every picture element; the mode of sampling every two picture elements; the mode of sampling every four picture elements; and the mode of sampling every eight picture elements.

Also a means similar to that shown in the first embodiment can be employed for forming the sampling clocks SCK required for carrying out these four sampling rate modes.

Moreover, in this embodiment, it is possible to set other modes than the above-mentioned sampling modes, e.g., the mode of sampling all the picture elements by three vertical scannings. The sampling clock employed in such a case can be readily formed by a means similar to the above mentioned by altering the frequency-dividing ratio of the reference clock from the clock generator 46.

If several kinds of sampling clock signals SCK thus formed and selectively changed over for use are employed as conversion-starting signals for the A/D converter 42 and moreover the digital video data converted by the A/D converter 42 are sampled and held, it becomes possible to selectively employ several kinds of time for writing the data in the memory. In addition, the arrangement is such that memory devices different in access time from each other can be properly changed over from one to another according to the selected write time. It is to be noted that the selection of a sampling clock corresponding to each write mode is effected by the mode changeover signal M from a sampling rate mode register 48.

Thus, it becomes possible to select a write time for the video data from the TV camera according to characteristics of the TV picture or the like and store the video data in the memory corresponding to the selected write time. Also in this embodiment, the video data from the TV camera are easier to handle if they are stored in the memory in the time series order on the TV screen. Although there is no problem in the case of the mode of sampling every picture element since the video data are sampled in the time series order, in the other modes the video data sampling order varies according to the sampling mode employed, i.e., how the picture elements are sampled.

For example, in FIG. 10, in the case of the mode of sampling every two picture elements, during a first vertical scanning period, the data about the picture elements corresponding to the sampling points $(X_S, Y_S)$, $(X_{S+2}, Y_S)$, $(X_{S+4}, Y_S)$ to $(X_{E-1}, Y_S)$, [where (E−S) represents any odd number] are delivered from the A/D converter 42, followed by the data about the picture elements corresponding to the sampling points $(X_S, Y_{S+1})$, $(X_{S+2}, Y_{S+1})$, $(X_{S+4}, Y_{S+1})$ to $(X_{E-1}, Y_{S+1})$, . . . $(Y_S, Y_E)$, $(X_{S+2}, Y_E)$, $(X_{S+4}, Y_E)$ to $(X_{E-1}, Y_E)$. Then, during a subsequent vertical scanning period, the data about the picture element corresponding to the sampling points $(X_{S+1}, Y_S)$, $(X_{S+3}, Y_S)$, $(X_{S+5}, Y_S)$ . . . $(X_E, Y_E)$ are delivered. In order to store these data in the memory in the time series order on the TV screen, it is necessary to regulate the order of addresses generated in the address generator 49. The regulation of the address generation order is required not only in the mode of sampling every two picture elements but also in the mode of sampling every four or eight picture elements and moreover in the mode of sampling every three or five picture elements or other sampling modes.

This embodiment permits the address generation order to be regulated in the address generator so that the video data are stored in the memory in the time series order on the TV screen, for any sampling mode and any sampling range.

Figure 11:
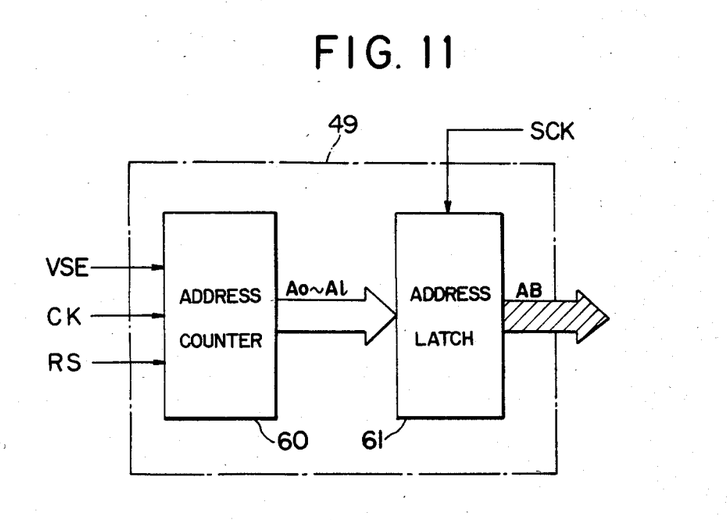
FIG. 11 is a block diagram of an example of an address generator of the device shown in FIG. 9.

An example of the construction of the address generator 49 having the above function is shown in FIG. 11. In the Figure, it is assumed that when video data are stored in the memory one address in the memory is assigned to one picture element. In FIG. 11, a reference numeral 60 denotes an address counter. Outputs $A_0$ to $A_l$ (l represents any integer; when the number of picture elements is 256 by 256, l=15) from the address counter 60 correspond to the lowest-order bit (LSB) to (l+1)th bit (MSB) of each address, respectively. In addition, a numeral 61 expresses an address latch. The address counter 60 is adapted to count up only for a sampling range during a scanning period for one frame and hold the contents thereof during a scanning period for other than the sampling range, according to the clock CK delivered from the clock generator 46 and the setting signal RS from the sampling range setting circuit 51. Such a sampling range setting circuit 51 that sends out a signal representative of a sampling range can be readily formed by combining comparator and register (not shown).

The address counter 60 is cleared by the vertical synchronizing signal VSE, and generates the same addresses during any vertical scanning period regardless of the sampling rate mode. The address latch 61 latches addresses formed by the address counter 60 according to various sampling clocks SCK and delivers the latched addresses onto the address bus AB. In consequence, the video data sampled by the sampling clocks SCK are placed at the respective addresses latched by the same sampling clocks. Therefore, the addresses corresponding to the respective picture elements are arranged in the time series order on the TV screen independently of the number of picture elements on horizontal scanning lines within the sampling range and the sampling rate mode. Such an address generator can be readily formed by the counter and the latch employing flip-flops, as mentioned hereinbefore.

Although in each of the above embodiments, the TV video data input apparatus having four sampling rate modes has been shown, since the reference clock can be stepped down at will, it is possible to specify video data sampling rate modes which are further subdivided by increasing the kinds of sampling clocks, e.g., adding sampling clocks for the mode of sampling every three or five picture elements.

Moreover, the TV video data input apparatus in accordance with the invention can be applied to not only TV video data but also a signal having a repeating period. In the case of such a signal, it is only required to input a pulse equal in repetition frequency to the signal as one corresponding to the vertical synchronizing signal VSE.

Although the invention has been described through specific terms, it is to be noted here that the described embodiments are not exclusive and various changes and modifications may be imparted thereto without departing from the scope of the invention which is limited solely by the appended claims.

What is claimed is:

1. A TV video data input apparatus comprising:
   a TV camera for producing a video signal;
   means for generating sampling clock signals in a plurality of modes different from each other on the basis of a reference clock;
   a sampling rate mode register means for selecting a mode of said clock signals corresponding to characteristics of a TV picture, said sampling rate mode register being controlled by a CPU in a computer;
   an A/D converting means for quantizing said video signal through A/D conversion on receipt of said sampling clock signals;
   a memory having a short access time or a memory having a long access time provided in the computer for storing the output from said A/D converting means; and
   a writing means, operatively connected with said memory and said means for generating clock signals, for writing in said memory the output from said A/D converting means,
   whereby the writing of the output from said A/D converting means into said memory having a short access time at a high speed and that into said memory having a long access time at a low speed can be switched over from one to the other by selectively changing the mode of said sampling clock signals.

2. A TV video data input apparatus according to claim 1, wherein said writing means is constituted by a low-order address generator that generates low-order addresses according to said sampling clock signals and a vertical synchronizing signal and a sampling rate mode changeover signal, and a high-order address generating counter that takes as its input the output of said low-order address generator to generate high-order addresses, and has the function of storing said video signal in said memory in the time series order on the TV screen regardless of the sampling order.

3. A TV video data input apparatus according to claim 1, wherein said writing means is constituted by an address counter that periodically generates a series of addresses according to said reference clock and a vertical synchronizing signal, and an address latch that latches the addresses delivered from said address counter according to said sampling clock signals and sends out said addresses onto an address bus, and has the function of storing said video signal in said memory in the time series order on the TV screen regardless of the sampling order.

4. A TV video data input apparatus according to claim 3, wherein said writing means has the function of storing in said memory only the data within a sampling range, in all the data on one frame, specified by a specifying signal from a sampling range setting means.

* * * * *